US008033663B2

(12) United States Patent
Valeri

(10) Patent No.: US 8,033,663 B2
(45) Date of Patent: Oct. 11, 2011

(54) ABRASION-RESISTANT TINTABLE COATING

(75) Inventor: Robert Valeri, St Petersburg, FL (US)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 217 days.

(21) Appl. No.: 12/372,134

(22) Filed: Feb. 17, 2009

(65) Prior Publication Data

US 2010/0210750 A1      Aug. 19, 2010

(51) Int. Cl.
*G02C 7/02*     (2006.01)
*B32B 27/00*    (2006.01)

(52) U.S. Cl. .......... 351/159; 351/162; 522/15; 522/170; 523/106; 428/412

(58) Field of Classification Search .................. 522/170, 522/15; 351/159, 162; 523/105, 106; 428/412
See application file for complete search history.

(56) References Cited

U.S. PATENT DOCUMENTS

| | | | | |
|---|---|---|---|---|
| 6,100,303 | A * | 8/2000 | Hirotani et al. | 518/703 |
| 7,067,565 | B2 * | 6/2006 | Valeri et al. | 522/170 |
| 7,452,611 | B2 * | 11/2008 | Blackburn et al. | 428/500 |
| 2006/0228560 | A1 * | 10/2006 | Stewart et al. | 428/412 |
| 2007/0238804 | A1 * | 10/2007 | Ho et al. | 522/77 |
| 2007/0275171 | A1 * | 11/2007 | Dang et al. | 427/384 |

* cited by examiner

*Primary Examiner* — Susan W Berman
(74) *Attorney, Agent, or Firm* — Young & Thompson

(57) ABSTRACT

A curable coating composition includes:
a) at least one monomer chosen from polyol poly(meth)acrylate monomers having from 3 to 6 (meth)acrylate functions,
b) at least one monomer chosen from polyol polyglycidyl ethers having at least three epoxy functions,
c) at least one difunctional monomer,
d) at least one free-radical photo-initiator, and
e) at least one cationic photo-initiator,
wherein the molar ratio of acrylate equivalents to epoxy equivalents in the composition ranges from 3:1 to 4:1, and wherein the composition is free of silica and of monomers bearing a silane function. A method for coating a substrate, such as an ophthalmic lens, with this composition, and the coating substrate thus obtained are also disclosed.

18 Claims, No Drawings

ABRASION-RESISTANT TINTABLE COATING

BACKGROUND OF THE INVENTION

The present invention pertains to a composition yielding an abrasion-resistant tintable coating on a thermoplastic or thermoset substrate, such as an ophthalmic lens.

It is known that transparent plastic materials such as polycarbonate ophthalmic lenses or screen face plates are subject to becoming dull and hazy due to scratching and abrasion during use.

Attempts have been made to overcome this problem. The technical solutions proposed in the past, which involved applying a UV-curable coating, generally used a solvent-borne composition which was usually substrate-dependant. That is, the coating compositions were formulated for one specific ophthalmic lens material such as CR-39 or thermoplastics such as polycarbonate. The few compositions found in the literature that were solvent-free or substantially solvent-free were either substrate-dependant or contained a partially hydrolyzed or fully hydrolyzed silane used both for adhesion and for abrasion resistance.

Moreover, coatings for ophthalmic lenses should also be capable of being tinted by incorporating a dye therein. However, abrasion and scratch resistance, on the one hand, and tintability, on the other hand, are often regarded as hardly compatible properties.

Among the solutions proposed to reconcile these properties, U.S. Pat. No. 5,614,321 suggests a curable coating composition comprising colloidal silica, together with a (meth)acrylate compound capable of reacting with said silica, a monomer (preferably an alkoxysilane) bearing (meth)acryloxy groups, a free radical initiator and an organic tintability additive. US 2002/0193479 teaches a composition comprising both an hydrolyzed and a non-hydrolyzed epoxy-functional alkoxy silane, together with a curing agent and an acrylic monomer preferably bearing not more than two acrylic functions. Similarly, U.S. Pat. No. 6,100,313 discloses a composition comprising an epoxy-functional alkoxysilane, a glycidyl ether, a cationic photo-initiator, an acrylic monomer and a free-radical photo-initiator.

It has been observed that compositions that utilize silane monomers, although both tintable and abrasion resistant, are hydrolytically unstable and have a rather short pot-life in a coating machine designed to recirculate the coating, because they absorb moisture from the atmosphere and/or from lenses that are not completely dry (after automatic water wash) during the coating process. This causes an increase in viscosity and produces coating flow defects on coated lenses. The hydrolyzed silane can also yield silica particles in the coating machine, resulting in particulate coating defects.

We have now discovered that it was possible to formulate a silane and silica-free coating composition bases on a specific combination of epoxy and acrylic monomers. This composition, when cured, leads with a good coating yield to a coating which provides excellent adhesion both to thermoset and thermoplastic substrates (especially with the commercial vacuum deposition anti-reflective coatings), which is tintable with an excellent uniformity, abrasion and scratch-resistant and which is hydrolytically stable both in a UV resistant bottle and when used in a coating machine that recirculates the coating.

SUMMARY OF THE INVENTION

The present invention provides a curable coating composition comprising:

a) at least one monomer chosen from polyol poly(meth)acrylate monomers having from 3 to 6 (meth)acrylate functions,
b) at least one monomer chosen from polyol polyglycidyl ethers having at least three epoxy functions,
c) at least one difunctional monomer,
d) at least one free-radical photo-initiator, and
e) at least one cationic photo-initiator, wherein the molar ratio of acrylate equivalents to epoxy equivalents in the composition ranges from 3:1 to 4:1, and wherein the composition is free of silica and of monomers bearing a silane function.

The present invention also provides a method for coating a substrate which comprises the step of coating said substrate with a composition as described above.

This invention further provides a method for manufacturing an article, comprising:

a) applying the composition according to claim 1 to at least one surface of a substrate,
b) curing said composition to form a coated surface on said substrate, and
c) optionally absorbing at least one dye into said coated surface.

Furthermore, the present invention provides an article obtainable according to said method.

DETAILED DESCRIPTION OF THE INVENTION

The coating composition according to this invention comprises at least five constituents including a polyol poly(meth)acrylate, a polyol polyglycidyl ether and a difunctional monomer, such that the molar ratio of acrylate equivalents to epoxy equivalents in the composition ranges from 3:1 to 4:1.

By "acrylates equivalent" or AEW and "epoxy equivalents" or EEW, it is meant an equivalent weight, measured in grams/equivalent. EEW is calculated using a titration method. According to this method, perchloric acid and tetraethylammonium bromide are used to produce hydrogen bromide which reacts quantitatively with epoxy groups to determine the amount of epoxy present in solution. The result is reported in grams of epoxy compound containing one equivalent of epoxy groups. Similarly, the acrylic equivalent weight is measured in grams/equivalent. This value is calculated by dividing the molecular weight of the acrylic compound by the number of acrylate functions per molecule. The moles of epoxy equivalent are then calculated by dividing the mass of each epoxy by the respective EEW and then taking the sum. Similarly, the moles of acrylates equivalent are calculated by dividing the mass of each acrylate by the respective AEW and then taking the sum.

The various components of this composition will now be described in further details.

Polyol poly(meth)acrylate Monomer

The first component in the composition according to this invention is a polyol poly(meth)acrylate monomer having from 3 to 6 acrylate functions. This term is intended to designate monomers bearing at least three acrylic or methacrylic acid functions reacted with alcohol functions. Examples of such monomers may be chosen from the group consisting of: pentaerythritol triacrylate, trimethylolpropane triacrylate, trimethylolpropane trimethacrylate, pentaerythritol tetraacrylate, glycerol triacrylate, 1,2,4-butanetriol trimethacrylate, propoxylated trimethylolpropane triacrylate, propoxylated glyceryl triacrylate, tris(2-hydroxy ethyl)isocyanurate triacrylate, ethoxylated trimethylolpropane triacrylate, di-trimethylolpropane tetraacrylate, dipentaerythritol pentaacrylate, ethoxylated pentaerythritol tetraacrylate, caprolactone modified dipentaerythritol hexaacrylate, dipentaerythritol hexaacrylate, and their mixtures. More specifically, the polyol poly(meth)acrylate monomers may be chosen from: pentaerythritol tri- and/or tetraacrylate, dipentaerythritol hexaacrylate and their mixtures.

These monomers are preferably employed at a weight concentration of from about 15% to about 40%, for instance from about 20 to 35%, based on the total weight of the composition (on a solids basis).

Polyol polyglycidyl ethers

The second component in the composition according to this invention is a polyol polyglycidyl ether. Examples of such compounds are: trimethylolmethane triglycidyl ether, trimethylolethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, diglycerol tetraglycidyl ether, dipentaerythritol tetraglycidyl ether, glycerol ethoxylate triglycidyl ether, glycerol propoxylate triglycidyl ether, sorbitol polyglycidyl ether, polyglycerol polyglycidyl ether, pentaerythritol polyglycidyl ether such as pentaerythritol tetraglycidyl ether, poly(glycidyl acrylate), poly(glycidyl methacrylate), epoxy-modified polyunsaturated fatty acids, castor oil triglycidyl ether, and their mixtures.

A preferred type of polyol polyglycidyl ether is a polyol triglycidyl ether. In an embodiment of this invention, the polyol triglycidyl ether is trimethylolpropane triglycidyl ether.

The polyol polyglycidyl ethers are preferably employed at a weight concentration of from about 15% to about 35%, for instance of from 20 to 30%, based on the total weight of the composition (on a solids basis).

Difunctional Monomers

The third component in the composition according to this invention is a difunctional monomer, such as a polyol di(meth)acrylate, a polyol diglycidyl ether or their mixtures.

Examples of polyol di(meth)acrylates include: neopentylglycol diacrylate, 1,6-hexanediol diacrylate, tetraethylene glycol diacrylate, 1,3-butylene glycol diacrylate, 1,3-butylene glycol dimethacrylate, ethylene glycol dimethacrylate, tetraethylene glycol dimethacrylate, 1,6-hexanediol dimethacrylate, ethylene glycol diacrylate, diethylene glycol diacrylate, glycerol diacrylate, 1,3-propanediol diacrylate, 1,3-propanediol dimethacrylate, 1,4-cyclohexanediol diacrylate, 1,4-cyclohexanediol dimethacrylate, pentaerythritol diacrylate, 1,5-pentanediol dimethacrylate, and their mixtures.

In an embodiment of this invention, the difunctional monomer is selected from the group consisting of polyol di(meth)acrylates. In a specific embodiment, the difunctional monomer comprises two polyol di(meth)acrylates, at least one of which is an alkanediol di(meth)acrylate and at least one of which is a polyethyleneglycol di(meth)acrylate. The difunctional monomer may thus comprise a mixture of 1,6-hexanediol diacrylate with at least one polyethyleneglycol di(meth)acrylate having at least three ethylene glycol units, such as tetraethylene glycol diacrylate.

Alternatively or in addition, the difunctional monomers may include at least one polyol diglycidyl ether. Examples of such compounds include: ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethyleneglycol diglycidyl ether, polypropyleneglycol diglycidyl ether, polytetramethyleneglycol diglycidyl ether, resorcinol diglycidyl ether, and their mixtures. In an embodiment of this invention, the diglycidyl ether may be 1,4-butanediol diglycidyl ether.

It is preferred, however, that the composition does not comprise any polyol diglycidyl ether.

The difunctional monomers are preferably employed at a weight concentration of from about 25 to about 50%, for instance from about 30% to about 45%, based on the total weight of the composition (on a solids basis).

Moreover, the weight ratio of the total amount of polyol poly(meth)acrylate monomers (including the polyol di(meth)acrylate monomer, when present) to epoxy monomers (including the difunctional epoxy monomers, when present) in the composition preferably ranges from 2:1 to 3:1, more preferably from 2.4:1 to 2.6:1.

Photo-Initiators

The composition of this invention comprises catalytic amounts of both free-radical initiators and cationic initiators.

As free-radical initiators, mention can be made of photo-activated and thermally activated photo-initiators.

Useful free-radical photo-initiators are haloalkylated aromatic ketones such as chloromethylbenzophenones; some benzoin ethers such as ethyl benzoin ether and isopropyl benzoin ether; dialkoxyacetophenones such as diethoxyacetophenone and α,α-dimethoxy-α-phenylacetophenone; hydroxy ketones such as (1-[4-(2-hydroxyethoxy)-phenyl]-2-hydroxy-2-methyl-1-propan-1-one) (Irgacure® 2959 from CIBA), 1-hydroxy-cyclohexyl-phenyl-ketone (Irgacure® 184 from CIBA) and 2-hydroxy-2-methyl-1-phenylpropan-1-one (such as Darocur® 1173 sold by CIBA); alpha amino ketones, particularly those containing a benzoyl moiety, otherwise called alpha-amino acetophenones, for example 2-methyl 1-[4-phenyl]-2-morpholinopropan-1-one (Irgacure® 907 from CIBA), (2-benzyl-2-dimethyl amino-1-(4-morpholinophenyl)-butan-1-one (Irgacure® 369 from CIBA); monoacyl and bisacyl phosphine oxides and sulphides, such as phenylbis(2,4,6-trimethylbenzoyl)-phosphine oxide (Irgacure® 819 sold by CIBA); triacyl phosphine oxides; and their mixtures.

Mixtures of free-radical photo-initiators may also be used to reach both surface cure and through cure. A mixture which may be used in one embodiment of this invention comprises Darocur® 1173 with Irgacure® 819, in a weight ratio of Darocur® 1173 to Irgacure® 819, which may range from 75:25 to 85:15, for instance of about 80:20. In another embodiment, free-radical initiator blends, such as Genocure® LTM sold by RAHN USA CORP., may be used.

Useful cationic initiators for the purpose of this invention include the aromatic onium salts, including salts of Group Va elements, such as phosphonium salts, e.g., triphenyl phenacylphosphonium hexafluorophosphate, salts of Group VIa elements, such as sulfonium salts, e.g., triphenylsulfonium tetrafluoroborate, triphenylsulfonium hexafluorophosphate (such as Cyracure® UVI-6992 sold by DOW CHEMICALS) and triphenylsulfonium hexafluoroantimonate (such as Cyracure® UVI-6976 sold by DOW CHEMICALS), and salts of Group VIIa elements, such as iodonium salts, e.g., diphenyliodonium chloride. Other cationic initiators can also be used in addition to those referred to above; for example, the phenyldiazonium hexafluorophosphates containing alkoxy or benzyloxy radicals as substituents on the phenyl radical as described in U.S. Pat. No. 4,000,115, the disclosure of which is incorporated herein by reference. Preferred cationic initiators for use in the compositions of this invention are the salts of Group VIa elements and especially the sulfonium salts.

Mixtures of cationic photo-initiators may also be used to reach both surface cure and through cure. A preferred mixture comprises Cyracure® UVI-6992 with Cyracure® UVI-6976, in a weight ratio of UVI®-6976 to UVI®-6992 which may range from 70:30 to 80:20, for instance of about 75:25.

The skilled artisan will be able to choose the appropriate amounts of free-radical and cationic photo-initiators so as to properly cure the acrylate and epoxy monomers in the composition of this invention. Moreover, the concentration of free-radical photo-initiator(s) should be adjusted so as to cure the epoxy monomers at a rate similar to the curing rate of the acrylate monomers. The cured coating could otherwise be hazy or not uniformly tinted.

The weight ratio of the cationic photo-initiators to the free-radical photo-initiators should be more than 1:1 and may range, for instance, from 2:1 to 4:1, preferably from 2.5:1 to 3.8:1 and more preferably from 2.8:1 to 3.5:1.

The total amount of free-radical photo-initiators may range, for instance, from 1.0 to 2.2 weight percent of the composition, whereas the cationic initiators may be used at a weight concentration of from about 5% to about 10%, for instance of from about 6% to about 8% relative to the total weight of the composition.

Other Components

The composition according to this invention may also comprise various additives such as flow control additives, radical scavengers, cure accelerators, photo-initiator synergists, fillers, pigments, solvents, and their mixtures.

Preferably, the coating composition comprises at least one surfactant. These surfactants may be water-soluble, water-insoluble or water-dispersible. They can include poly(alkylene glycol) modified polymers, based on polydimethylsiloxanes or polyheptamethylsiloxanes, The composition of this invention may advantageously also comprise at least one slip agent such as fluorocarbon containing modified polysiloxanes, such as Efka® 3034 sold by CIBA or silicone acrylates such as Ebecryl® 1360 sold by CYTEC.

The coating composition may also comprise, in some embodiments, an adhesion promoter such as an adduct of bisphenol A diglycidyl ether and a butadiene-acrylonitrile elastomer. An example of such a compound is sold by CVC THERMOSET SPECIALTIES under the trade name Hypox® RA1340.

However, the coating composition does not include any silica (such as colloidal silica). It does not include either any silane-containing monomer, such as an alkoxysilane-containing monomer, including epoxyalkyl- or acryloxyalkyl-modified alkoxysilanes.

Moreover, this composition is preferably free of solvent.

Coating Process

The composition of this invention may be applied to a substrate in order to protect it from scratch and/or abrasion and thus to manufacture a coated article.

A typical method for manufacturing such an article comprises:
a) applying the composition as described above to at least one surface of a substrate,
b) curing said composition to form a coated surface on said substrate, and
c) optionally absorbing at least one dye into said coated surface.

The substrate may be made of any organic polymer, metal or glass. Examples of such substrates include acrylic polymers like poly(methylmethacrylate), polyesters, such as poly (ethylene terephthalate), poly (butylene terephthalate), etc., polyamides, polyimides, acrylonitrile-styrene copolymers, styrene-acrylonitrile-butadiene copolymers, polyvinyl chloride, butyrates, polyethylene and the like. The coating compositions of this invention are especially useful as coatings for polycarbonates, such as poly (bisphenol-A carbonate) and those polycarbonates known as Lexan®, sold by GENERAL ELECTRIC COMPANY, and as coatings for injection molded or extruded acrylics, such as polymethylmethacrylates. Metal substrates on which the present protective coatings are also effective include bright and dull metals like aluminum and bright metallized surfaces like sputtered chromium alloy. Other solid substrates contemplated herein include wood, painted surfaces, leather, glass, ceramics and textiles.

Typical examples of such substrates are ophthalmic finished or semi-finished ophthalmic lenses. In an embodiment, the surface to be coated may be the concave surface. However, in another embodiment, both surfaces of the substrate may be coated with the composition of this invention. Other useful substrates include television and computer screen face plates.

Although not necessary, prior to the composition being coated upon a substrate there may optionally be included a priming step wherein a primer such as a thermosetting acrylic emulsion could first be applied to the substrate.

After the coating composition is applied to the substrate or the primed substrate, the coating may be cured thereon by an effective amount of UV-radiation, which may be obtained from, for example, a Hanovia 550 watt lamp or a PPG Processor, Model QC1202.

The coating compositions of the present invention can be applied to the selected substrate by conventional methods, such as flowing, spraying or dipping, to form a continuous surface film. In a preferred embodiment, the composition of this invention is applied onto the substrate by a spin coating method.

Effect of the Composition

The composition according to this invention provides for a coating which is capable of being uniformly tinted at a high rate and has good dye retention after tinting, good adhesion to both thermoplastics and thermosets and good scratch and/or abrasion resistance. Moreover, this composition preferably has a viscosity which is compatible with the conventional spin coating equipments.

The above properties may be assessed using the following criteria.

1. Coating Tintability

The percent light transmission of polycarbonate and CR-39 substrates tinted with BPI dyes should be equal or less than those of lenses coated with the commercial UVNV® sold by ULTRA OPTICS. Preferably, coated polycarbonate should tint to 30% transmission or less in 96C BPI black after 15 minutes and coated CR-39 should tint to 30% transmission or less in 92C BPI black after 15 minutes, when measured by means of a spectrophotometer.

2. Tint Uniformity

Tint uniformity should be at least equal to that of other commercial tintable coatings such as UVNV® (no visible blotchiness or uneven cure patterns) as viewed over white paper with an overhead light source in transmission after tinting.

3. Dye Retention

Minimum amount of excess dye should be able to be removed after tinting, when the tinted lens is wiped with IPA.

4. Abrasion Resistance

ASTM (Method D 1003) Haze level on polycarbonate substrate should be 0.5% or less as measured using a BYK Gardener Hazeguard®.

Bayer abrasion: ISTM 02-002 and 02-008 (haze measurement). Abrasion Resistance is measured using the ISTM Bayer test. ISTM 02-002 describes the Bayer test as a method to compare the abrasion resistance of a test lens with that of an uncoated CR-39 standard lens. A test lens and a standard CR-39 lens having equal convex base curves are secured to a pan that exposes the convex side of each lens to 500 grams of abrasive material. The pan, containing the abrasive material, is cycled back and forth laterally for 600 cycles in four (4) minutes. After the lenses are cleaned, the haze is measured. The change in haze of the standard and the test lens are then expressed as a ratio where R=change in haze of the standard lens divided by the change in haze of the test lens. R is referred to as the Bayer value of the lens. Moreover, Bayer Abrasion should be around 1.0, thus similar to uncoated CR-39.

5. Scratch Resistance

The grade in Hand Steel Wool test should be from 3 to 5, thus similar to UVNV® coatings.

6. Adhesion (ISTM 02-010)

Crosshatch Adhesion is performed on coated lenses by cutting a grid of 25×1 mm squares using a tool that has six (6) parallel razor blades 1 mm apart. The grid must be cut into the coating at least 5 to 10 mm from the edge of the lens. Then, using 3M 250 Tape having nominal adhesion on steel=710 cN/cm (D-3330), a piece of tape that has not been exposed to air is removed from the roll and applied uniformly to the grid using a plastic spatula with approximately 15 to 20 mm of tape off of the edge of the lens. The tape is quickly removed from the lens with a sharp, rapid continuous movement. This is repeated 5 times on the same grid. A score of 0 refers to no coating loss. A score of 1 refers to less than one half of one square of coating loss. Any loss of coating greater than one half of one square is considered a failure. Adhesion to surfaced 1.60 (MR8) and 1.67 (MR7) lenses clear, and after tinting in BPI dye for 15 minutes, should be 0 or 1, optionally after using CR-scrub.

Moreover, adhesion to surfaced polycarbonate and CR-39 lenses clear, and at least one hour after tinting in BPI dye for 15 minutes, should be equal to 0 or 1 in the crosshatch test carried out at least one hour after coating.

7. Viscosity

100% solids composition (no solvent) should have a viscosity of less than 60 centipoises and preferably of not more than 50 centipoises or even close to 40 centipoises, which is compatible with the conventional production spin coating equipment.

EXAMPLES

This invention will be further illustrated by the following non-limiting examples which are given for illustrative purposes only.

Example 1

Preparation of Coating Compositions According to the Invention

Four curable coating compositions A to D according to this invention were prepared. Their composition is given in the following Table 1.

These compositions were prepared as follows. The epoxy and acrylate compounds were mixed one at a time into a light proof container, along with the slip agents. The photo-initiators were added last before mixing. For one kg batches (lab size), each composition was mixed for a minimum of two hours using a high speed mixer followed by mixing overnight (16 hours) with a magnetic stir bar to remove bubbles. The compositions were then stored at room temperature in UV resistant brown bottles.

TABLE 1

Coating compositions

| CHEMICAL NAME | TRADE NAME | EXAMPLE 1A wt. % | EXAMPLE 1B wt. % | EXAMPLE 1C wt. % | EXAMPLE 1D wt. % |
|---|---|---|---|---|---|
| TRIMETHYLOLPROPANE TRIGLYCIDYL ETHER | ERYSIS GE-30 | 25.305 | 26.729 | 25.175 | 25.249 |
| PENTAERYTHRITOL TRI-AND TETRAACRYLATE | PETIA | 23.056 | — | 33.231 | 28.055 |
| DIPENTAERYTHRITOL HEXAACRYLATE | MIRAMER M-600 | — | 22.787 | — | — |
| 1,6 HEXANEDIOL DIACRYLATE | SR238 | 26.430 | 32.871 | 20.14 | 27.83 |
| TETRAETHYLENE GLYCOL DIACRYLATE | SR268 | 15.858 | 7.962 | 12.084 | 9.651 |
| TRIARYLSULFONIUM HEXAFLUOROANTIMONATE SALTS | CYRACURE UVI-6976 | 4.695 | 4.960 | 4.67 | 4.684 |
| TRIARYLSULFONIUM HEXAFLUOROPHOSPHATE SALTS | CYRACURE UVI-6992 | 1.565 | 1.653 | 1.557 | 1.561 |
| 2-HYDROXY-2-METHYL-1-PHENYL-PROPANE-1-ONE | DAROCUR 1173 | — | — | 1.55 | — |
| PHENYLBIS(2,4,6 TRIMETHYLBENZOYL)-PHOSPHINE OXIDE | IRGACURE 819 | — | — | 0.517 | — |
| LIQUID FREE RADICAL PHOTOINITIATOR BLEND | GENOCURE LTM | 2.009 | 2.038 | — | 1.889 |
| FLUOROCARBON MODIFIED POLYSILOXANE SURFACTANT | EFKA 3034 | 0.425 | 0.427 | 0.423 | 0.424 |
| SILICONE HEXAACRYLATE | EBECRYL 1360 | 0.658 | 0.574 | 0.655 | 0.656 |
| Viscosity | | 40.8 cps | 44.5 cps | 63.9 cps | 48.9 cps |
| Moles of epoxy equivalents/ | | 21.39%/ | 24.50%/ | 20.45%/ | 20.53%/ |
| Moles of acrylate equivalents | | 78.60% | 75.50% | 79.55% | 79.46% |
| Molar ratio of acrylate equivalents to epoxy equivalents | | 3.67 | 3.08 | 3.89 | 3.87 |

These compositions were assessed for the six criteria mentioned before and passed successfully the tests described before.

The composition of Example 1A had particularly a low viscosity combined with a fast tinting rate. The coating obtained therefrom reached 20% transmission in BPI black dye in only 15 minutes.

This example demonstrates that the compositions according to this invention, which have a molar ratio of (non-silicon) acrylate functions to epoxy functions of from 3.0 to 4.0 are useful as coating compositions for thermoplastic and thermoset substrates.

Example 2

Preparation of Comparative Coating Compositions

Comparative compositions 2A to 2E were prepared in the same way as the above Compositions 1A to 1D. Their constituents are indicated in the following Table 2.

Example 3

Preparation of a Comparative Coating Composition

A masterbatch was prepared by mixing: 25.87 g of ERYSIS® GE-30, 21.32 g of ERYSIS® GE-21, 32.06 g of MIRAMER® M-600, 7.67 g of CYRACURE® UVI-6976, 1.73 g of DAROCUR® 1173 and IRGACURE® 819, 0.53 g of EFKA® 3034 and 0.75 g of EBECRYL® 1360.

13.84 g of this masterbatch were then mixed with 6.17 g of SR® 268 to provide about 20 g of a coating composition.

The molar ratio of acrylate equivalents to epoxy equivalents was 1.86.

This formula was quite clear (no haze), but the adhesion on polycarbonate was not good.

TABLE 2

Comparative coating compositions

| CHEMICAL NAME | EXAMPLE 2A wt. % | EXAMPLE 2B wt. % | EXAMPLE 2C wt. % | EXAMPLE 2D wt. % | EXAMPLE 2E wt. % |
|---|---|---|---|---|---|
| TRIMETHYLOLPROPANE TRIGLYCIDYL ETHER | 19.9 | 19.485 | 19.42 | 20.332 | 30.390 |
| 1,4 BUTANEDIOL DIGLYCIDYL ETHER | 21.392 | 20.946 | 20.88 | 10.166 | — |
| DIPENTAERYTHRITOL HEXAACRYLATE | 24.661 | 24.146 | 28.260 | 26.696 | 22.551 |
| 1,6 HEXANEDIOL DIACRYLATE | 25.832 | 25.293 | 2.179 | 20.332 | 26.339 |
| TETRAETHYLENE GLYCOL DIMETHACRYLATE | — | — | 22.099 | — | — |
| TETRAETHYLENE GLYCOL DIACRYLATE | — | — | — | 12.199 | 10.130 |
| TRIARYLSULFONIUM HEXAFLUOROANTIMONATE SALTS | 5.897 | 5.623 | 3.049 | 5.659 | 5.639 |
| TRIARYLSULFONIUM HEXAFLUOROPHOSPHATE SALTS | — | 1.874 | 1.032 | 1.886 | 1.879 |
| 2-HYDROXY-2-METHYL-1-PHENYL-PROPANE-1-ONE | 1.059 | 1.323 | 1.682 | 1.390 | 1.731 |
| PHENYLBIS(2,4,6 TRIMETHYLBENZOYL)-PHOSPHINE OXIDE | 0.265 | 0.337 | 0.420 | 0.347 | 0.346 |
| FLUOROCARBON MODIFIED POLYSILOXANE SURFACTANT | 0.417 | 0.408 | 0.417 | 0.424 | 0.422 |
| SILICONE HEXAACRYLATE | 0.577 | 0.565 | 0.561 | 0.570 | 0.568 |
| Viscosity | 40.6 cps | 40.1 cps | 59.7 cps | 54.1 cps | 55.5 cps |
| Moles of epoxy equivalents/Moles of acrylate equivalents | 35.65%/ 64.35% | 35.63%/ 64.37% | 37.10%/ 62.90% | 26.82%/ 73.18% | 26.00%/ 74.00% |
| Molar ratio of acrylate equivalents to epoxy equivalents | 1.8 | 1.8 | 1.7 | 2.7 | 2.8 |

Example 2A provided a coating composition having a high Haze on polycarbonate. It was found that the increase in photo-initiators to arrive at Example 2B enabled to lower this Haze, which remained nonetheless not acceptable. The acrylate compounds of the composition were then changed to get Example 2C which provided for a better Haze. However, this coating composition did not adhere enough to polycarbonate. Another attempt to modify the formulation was then made, which led to Example 2 D. However, the tint uniformity of the resulting composition was not acceptable with this coating composition, which also leached dye after tinting when wiped with IPA. Another formulation change was then attempted which led to Example 2 E. This composition did not provide either for uniform tinting.

Finally, none of these compositions met the required criteria for a uniformly tinted coating having a low Haze and good adhesion to its substrate. This was attributed to the low molar ratio of acrylate to epoxy equivalents.

The invention claimed is:

1. A curable coating composition comprising:
   a) at least one monomer chosen from polyol poly(meth)acrylate monomers having from 3 to 6 (meth)acrylate functions,
   b) at least one monomer chosen from polyol polyglycidyl ethers having at least three epoxy functions,
   c) at least one difunctional monomer,
   d) at least one free-radical photo-initiator, and
   e) at least one cationic photo-initiator,
   wherein the molar ratio of acrylate equivalents to epoxy equivalents in the composition ranges from 3:1 to 4:1, and wherein the composition is free of silica and monomers bearing a silane function.

2. The composition according to claim 1, wherein the polyol poly(meth)acrylate monomer is selected from the group consisting of: pentaerythritol triacrylate, pentaerythritol tetraacrylate, dipentaerythritol hexaacrylate and their mixtures.

3. The composition according to claim 1, wherein the polyol polyglycidyl ether is a polyol triglycidyl ether.

4. The composition according to claim 3, wherein the polyol polyglycidyl ether is trimethylolpropane triglycidyl ether.

5. The composition according to claim 1, wherein the difunctional monomer comprises at least one polyol di(meth)acrylate, at least one polyol diglycidyl ether, or a mixture thereof.

6. The composition according to claim 5, wherein the difunctional monomer is selected from the group consisting of polyol di(meth)acrylates.

7. The composition according to claim 6, wherein the difunctional monomer comprises two polyol di(meth)acrylates, at least one of which is an alkanediol di(meth)acrylate and at least one of which is a polyethyleneglycol di(meth)acrylate.

8. The composition according to claim 7, wherein the difunctional monomer comprises a mixture of 1,6-hexanediol diacrylate with at least one polyethyleneglycol di(meth)acrylate having at least three ethylene glycol units.

9. The composition according to claim 1, wherein the weight ratio of the total amount of polyol poly(meth)acrylate monomers, including polyol di(meth)acrylate monomers, to epoxy monomers in the composition ranges from 2:1 to 3:1, preferably from 2.4:1 to 2.6:1.

10. The composition according to claim 1, which is substantially free of solvent.

11. The composition according to claim 1, which comprises at least one surfactant, at least one slip agent or a mixture thereof.

12. A method for manufacturing an article, comprising:
    a) applying the composition according to claim 1 to at least one surface of a substrate,
    b) curing said composition to form a coated surface on said substrate.

13. The method according to claim 12, which further comprises the step of absorbing at least one dye into said coated surface.

14. A method for treating a substrate, comprising
    coating said substrate with a composition according to claim 1.

15. The method according to claim 12, wherein the substrate is a finished or semi-finished ophthalmic lens.

16. An article manufactured according to the method of claim 12.

17. The method according to claim 13, wherein the substrate is a finished or semi-finished ophthalmic lens.

18. An article manufactured according to the method of claim 13.

* * * * *